United States Patent
Kim et al.

(10) Patent No.: US 11,031,661 B2
(45) Date of Patent: Jun. 8, 2021

(54) SECONDARY BATTERY AND METHOD FOR MANUFACTURING THE SAME

(71) Applicant: LG Chem, Ltd., Seoul (KR)

(72) Inventors: Sang Hun Kim, Daejeon (KR); Yong Kim, Daejeon (KR); Yong Su Choi, Daejeon (KR); Hyung Kyun Yu, Daejeon (KR); Soo Ji Hwang, Daejeon (KR); Na Yoon Kim, Daejeon (KR); Min Hyeong Kang, Daejeon (KR)

(73) Assignee: LG Chem, Ltd.

( * ) Notice: Subject to any disclaimer, the term of this patent is extended or adjusted under 35 U.S.C. 154(b) by 150 days.

(21) Appl. No.: 16/332,598

(22) PCT Filed: May 9, 2018

(86) PCT No.: PCT/KR2018/005326
§ 371 (c)(1),
(2) Date: Mar. 12, 2019

(87) PCT Pub. No.: WO2018/216930
PCT Pub. Date: Nov. 29, 2018

(65) Prior Publication Data
US 2020/0127273 A1 Apr. 23, 2020

(30) Foreign Application Priority Data
May 25, 2017 (KR) ........................ 10-2017-0064899

(51) Int. Cl.
*H01M 2/34* (2006.01)
*H01M 2/06* (2006.01)
(Continued)

(52) U.S. Cl.
CPC ....... *H01M 50/578* (2021.01); *H01M 50/172* (2021.01); *H01M 50/531* (2021.01); *H01M 50/543* (2021.01); *H01M 2200/20* (2013.01)

(58) Field of Classification Search
CPC .......... H01M 2/345; H01M 2/06; H01M 2/26; H01M 2/30; H01M 2200/20; H01M 2/347;
(Continued)

(56) References Cited

U.S. PATENT DOCUMENTS

| 6,713,209 B1 | 3/2004 | Naskali |
| 2010/0055558 A1 | 3/2010 | Choi et al. |

(Continued)

FOREIGN PATENT DOCUMENTS

| CN | 101454925 A | 6/2009 |
| CN | 104137293 A | 11/2014 |

(Continued)

OTHER PUBLICATIONS

International Search Report for Application No. PCT/KR2018/005326 dated Aug. 24, 2018.
(Continued)

*Primary Examiner* — Lisa S Park
(74) *Attorney, Agent, or Firm* — Lerner, David, Littenberg, Krumholz & Mentlik, LLP

(57) ABSTRACT

A secondary battery is disclosed.
According to the present invention, when an internal pressure exceeding a certain level occurs, current may be interrupted to stop an operation of the secondary battery, thereby preventing the secondary battery from being ignited or exploded by the increase in internal pressure of the secondary battery and improving safety of the secondary battery.

12 Claims, 6 Drawing Sheets

(51) Int. Cl.
*H01M 2/26* (2006.01)
*H01M 2/30* (2006.01)
*H01M 50/578* (2021.01)
*H01M 50/172* (2021.01)
*H01M 50/531* (2021.01)
*H01M 50/543* (2021.01)

(58) Field of Classification Search
CPC ............ H01M 2/1241; H01M 50/578; H01M 50/172; H01M 50/531; H01M 50/543; H01M 50/579; H01M 50/3425; Y02E 60/10
See application file for complete search history.

(56) References Cited

U.S. PATENT DOCUMENTS

| | | | |
|---|---|---|---|
| 2010/0323235 A1* | 12/2010 | Takami | H01M 10/0583 |
| | | | 429/158 |
| 2014/0011060 A1 | 1/2014 | Yang et al. | |
| 2016/0149201 A1 | 5/2016 | Min et al. | |
| 2017/0110711 A1 | 4/2017 | Ahn et al. | |
| 2017/0110712 A1 | 4/2017 | Ahn et al. | |
| 2017/0117515 A1 | 4/2017 | Ahn et al. | |
| 2018/0053976 A1 | 2/2018 | Park et al. | |
| 2020/0127273 A1 | 4/2020 | Kim et al. | |

FOREIGN PATENT DOCUMENTS

| | | | |
|---|---|---|---|
| CN | 106601976 | A | 4/2017 |
| EP | 0961331 | A1 | 12/1999 |
| EP | 3157074 | A1 | 4/2017 |
| EP | 3490035 | A1 | 5/2019 |
| EP | 3490036 | A1 | 5/2019 |
| JP | 2008153204 | A | 7/2008 |
| JP | 5389368 | B2 | 1/2014 |
| JP | 6043428 | B2 | 12/2016 |
| JP | 2019533295 | A | 11/2019 |
| KR | 20110048470 | A | 5/2011 |
| KR | 20140141262 | A | 12/2014 |
| KR | 20160125920 | A | 11/2016 |
| KR | 101704129 | B1 | 2/2017 |
| KR | 20170021102 | A | 2/2017 |
| KR | 20170025872 | A | 3/2017 |
| KR | 20170044938 | A | 4/2017 |
| KR | 20170047046 | A | 5/2017 |
| WO | 2018216930 | A1 | 11/2018 |

OTHER PUBLICATIONS

Extended European Search Report including Written Opinion for Application No. EP18806077.6, dated Jun. 28, 2019, pp. 1-9.
Chinese Search Report for Application No. 201880003431, dated Mar. 3, 2021, 8 pages.

* cited by examiner

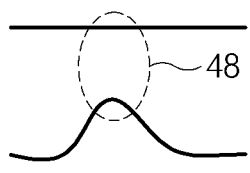
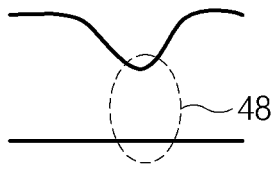
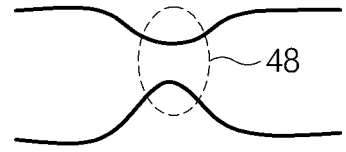
F I G. 5A                F I G. 5B                F I G. 5C

SECONDARY BATTERY AND METHOD FOR MANUFACTURING THE SAME

CROSS-REFERENCE TO RELATED APPLICATION

The present application is a national phase entry under 35 U.S.C. § 371 of International Application No. PCT/KR2018/005326, filed on May 9, 2018, which claims priority from Korean Patent Application No 10-2017-0064899, filed on May 25, 2017, all of which are hereby incorporated by reference in their entireties.

TECHNICAL FIELD

The present invention relates to a secondary battery and a method for manufacturing the same, and more particularly, to a secondary battery having a structure in which an operation of the secondary battery is stopped when a pressure within the secondary battery increases to improve safety and a method for manufacturing the same.

BACKGROUND ART

Secondary batteries that are repeatedly chargeable and dischargeable generally have a structure in which an electrode assembly including an electrode and a separator is accommodated in an outer case. Particularly, a secondary battery may include an electrode lead electrically connecting a electrode tab protruding from an electrode assembly to an external electronic device.

When the secondary battery is exposed to an environment or an external impact, a gas may be generated in the secondary battery, and thus, an internal pressure of the secondary battery may increase. When the internal pressure of the secondary battery increases, the performance of the secondary battery may not be exhibited properly. In particular, when the internal pressure of the secondary battery exceeds a certain level, ignition or explosion may occur in the secondary battery. Thus, in view of the safety of the secondary battery, it is necessary to provide a secondary battery including a safety device for preparing a case in which the internal pressure of the secondary battery exceeds a certain level.

DISCLOSURE OF THE INVENTION

Technical Problem

Therefore, to solve this problem, an object of the present invention is to provide a secondary battery in which when an internal pressure exceeding a certain level occurs, current is interrupted to stop an operation of the secondary battery, thereby preventing the secondary battery from being ignited or exploded by an increase in internal pressure of the secondary battery and improving safety of the secondary battery.

Technical Solution

According to an aspect of the present invention for achieving the above object, a secondary battery includes: an electrode assembly including an electrode tab; an outer case accommodating the electrode assembly; and an electrode lead electrically connected to the electrode tab, wherein the electrode lead includes: an outer protrusion protruding to the outside of the outer case; an inner connection part disposed in the outer case; and a notch part disposed on the inner connection part and having a relatively thin thickness when compared to that of the other area of the electrode lead, wherein the notch part is disposed in a direction crossing a direction that is directed from the electrode assembly toward the outer protrusion, the inner connection part includes: a tab bonding area disposed on one side of the notch part and bonded to the electrode tab; and a tab non-bonding area disposed on the other side of the notch part and integrally connected to the outer protrusion, wherein the inner connection part is bent by using the notch part as an axis so that the tab bonding area and the tab non-bonding area face each other.

The notch part may include a first notch part and a second notch part, which are spaced apart from each other, and the inner connection part may be bent by using the first notch part and the second notch part as axes.

The bent directions of the inner connection part by using the first notch part and the second notch part as the axes may be opposite to each other.

The electrode lead may have a straight-line (I) shape when the inner connection part is unfolded by using the notch part as an axis.

The notch part may have a shape that is recessed into only one surface of both surfaces of the inner connection part.

The notch part may have a shape that is recessed into both surfaces of the inner connection part.

The notch part may have a thickness that varies according to a position thereof.

The first notch part may be disposed relatively close to the electrode assembly when compared to the second notch part, and the first notch part may have a thickness less than that of the second notch part.

The first notch part may be disposed relatively close to the electrode assembly when compared to the second notch part, and the second notch part may have a thickness less than that of the first notch part.

The notch part may have a thickness that gradually decreases in both directions, in which the notch part is disposed, with respect to a predetermined point.

The notch part may have a thickness that gradually increases in both directions, in which the notch part is disposed, with respect to a predetermined point.

The secondary battery may further include a conductive material having electrical conductivity, which is applied to at least a portion of a surface of the notch part.

The conductive material may have a rupture strength less than that of the electrode lead.

Advantageous Effects

According to the present invention, when an internal pressure exceeding a certain level occurs, current may be interrupted to stop an operation of the secondary battery, thereby preventing the secondary battery from being ignited or exploded by the increase in internal pressure of the secondary battery and improving safety of the secondary battery.

BRIEF DESCRIPTION OF THE DRAWINGS

FIGS. 5A to 5C are side cross-sectional views illustrating a shape of a notch part formed on one surface or both surfaces of an inner connection part of the secondary battery according to an embodiment of the present invention.

MODE FOR CARRYING OUT THE INVENTION

Hereinafter, a structure of a secondary battery according to the present invention will be described with reference to the accompanying drawings.

Figure 1:
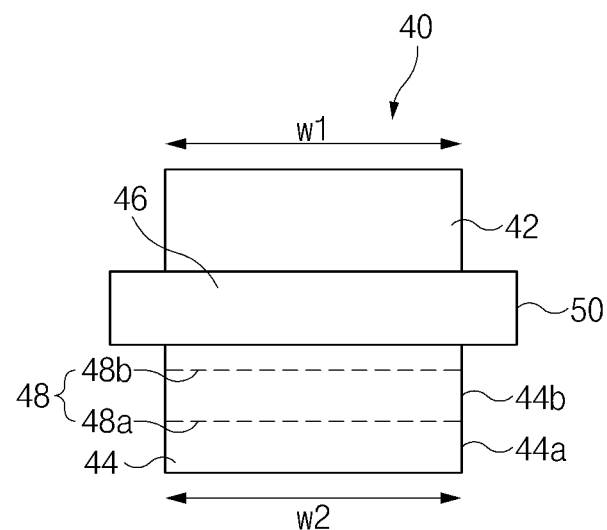
FIG. 1 is a plan view illustrating a structure of an electrode lead of a secondary battery according to an embodiment of the present invention.
Figure 2:
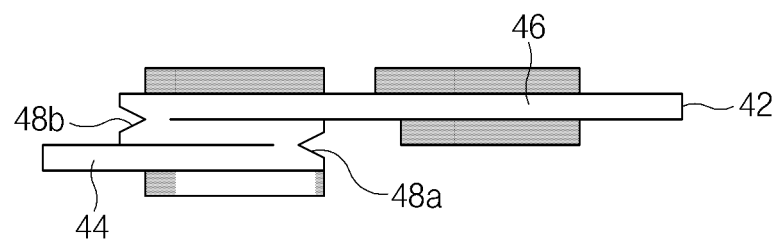
FIG. 2 is a side cross-sectional view of the structure of the electrode lead of the secondary battery according to an embodiment of the present invention.

FIG. 1 is a plan view illustrating a structure of an electrode lead of a secondary battery according to an embodiment of the present invention, and FIG. 2 is a side cross-sectional view of the structure of the electrode lead of the secondary battery according to an embodiment of the present invention.

Figure 3:
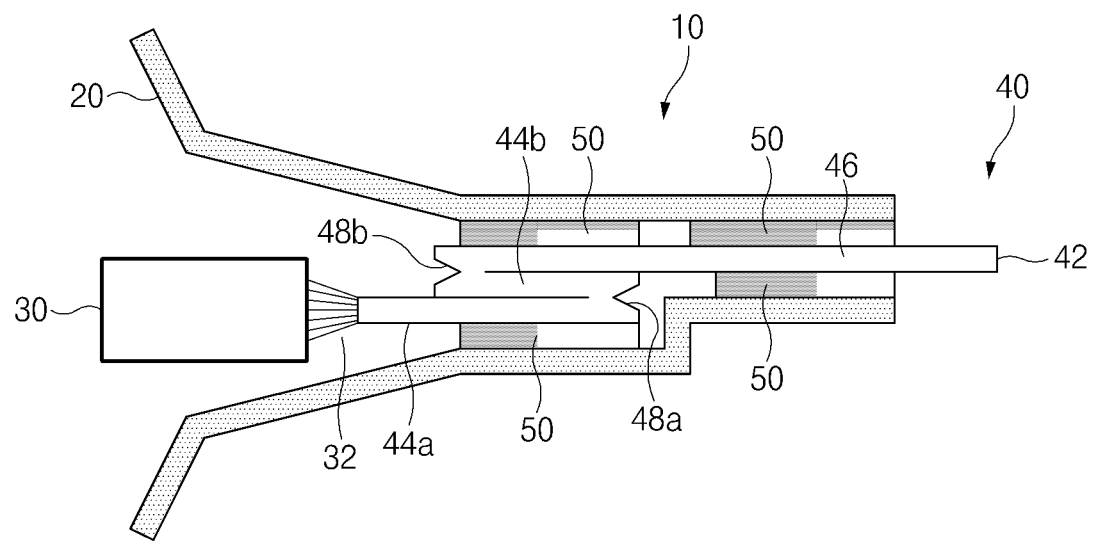
FIG. 3 is a side cross-sectional view illustrating a connection structure of the electrode lead and an electrode tab in the secondary battery according to an embodiment of the present invention.
Figure 4:
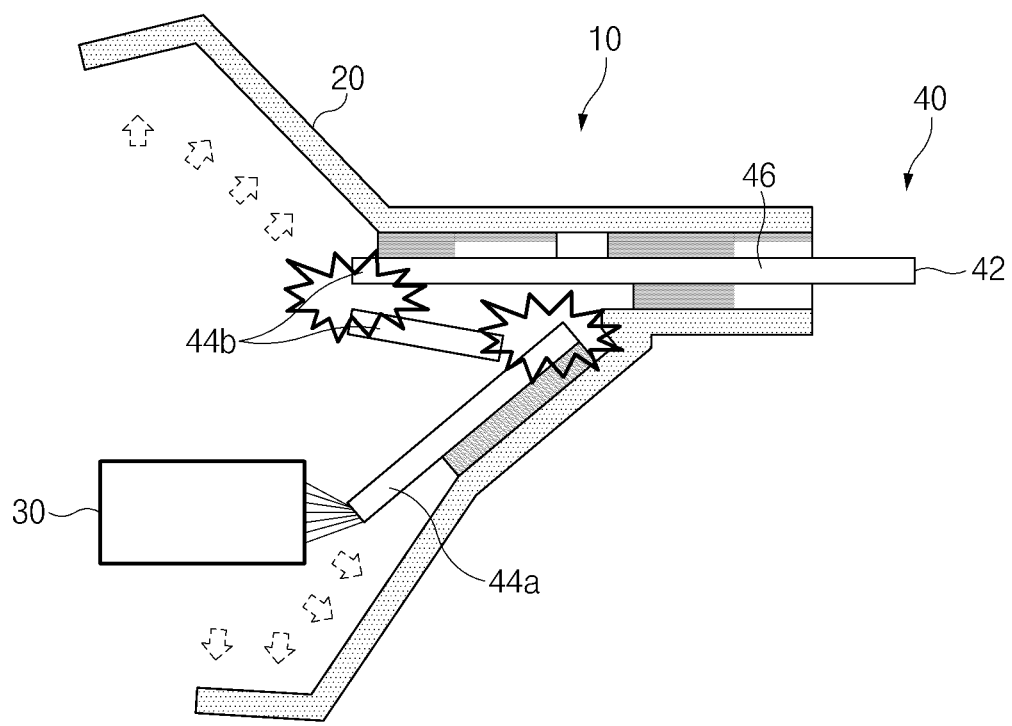
FIG. 4 is a side cross-sectional view illustrating a state in which the connection structure of the electrode lead and the electrode tab is ruptured when an internal pressure of the secondary battery increases in the secondary battery according to an embodiment of the present invention.

FIG. 3 is a side cross-sectional view illustrating a connection structure of the electrode lead and an electrode tab in the secondary battery according to an embodiment of the present invention, and FIG. 4 is a side cross-sectional view illustrating a state in which the connection structure of the electrode lead and the electrode tab is ruptured when an internal pressure of the secondary battery increases in the secondary battery according to an embodiment of the present invention.

Referring to FIG. 3, a secondary battery 10 according to an embodiment of the present invention may include an electrode assembly 30 including an electrode and a separator, an electrode tab 32 protruding from the electrode assembly 30, and an outer case 20 accommodating the electrode assembly 30 and the electrode tab 32. Here, the outer case 20 may be a pouch. The secondary battery according to an embodiment of the present invention may be a pouch-type secondary battery.

Continuously, Referring to FIG. 3, the secondary battery 10 may include an electrode lead 40 electrically connecting the electrode assembly 30 to an external device that requires power such as an electronic device. Here, the electrode lead 40 may be electrically connected to the electrode tab 32 protruding from the electrode assembly 30.

Referring to FIG. 1, a portion of the electrode lead 40 of the secondary battery 10 according to an embodiment of the present invention may be provided in the outer case 20, and the other portion may protrude from the outer case 20. That is, the electrode lead 40 may include an outer protrusion 42 protruding to the outside of the outer case 20, an inner connection part 44 disposed in the outer case 20, and an insulation part 46 disposed between the outer protrusion 42 and the inner connection part 44 and facing the outer case (see reference numeral 20 of FIG. 3). Here, as illustrated in FIGS. 1 and 3, an insulation film 50 for electrically blocking the inside of the secondary battery from the outside of the secondary battery except for the electrode lead 40 may be provided between the insulation part 46 and the outer case 20. As illustrated in FIG. 3, the insulation film 50 may also be provided on an area of the inner connection part 44 facing the outer case 20.

As illustrated in in FIGS. 1 and 2, a notch part 48 having a relatively thinner thickness than that of the other region of the electrode lead 40 may be formed on the electrode lead 40 of the secondary battery 10 according to an embodiment of the present invention. As illustrated in FIG. 1, the notch part 48 may be formed on the inner connection part 44. Also, as illustrated in FIGS. 1 to 3, the notch part 48 may be formed in a direction crossing a direction that is directed from the electrode assembly 30 toward the outer protrusion 42.

According to an embodiment of the present invention, since the notch part is formed on the electrode lead, when an internal pressure of the secondary battery increases, the electrode lead may be cut with respect to the notch part. In this case, the electrode assembly (or the electrode tab) and the external device such as the electronic device, which are electrically connected to each other through the electrode lead, may be electrically interrupted to stop an operation of the secondary battery. Thus, the secondary battery may be prevented from increasing in internal pressure to prevent the secondary battery from being ignited or exploded.

Continuously, referring to FIGS. 1 to 3, the notch part 48 may be provided in plurality. That is, as illustrated in FIGS. 1 to 3, the notch part 48 may include a first notch part 48a and a second notch part 48b. FIGS. 1 to 3 illustrates the first notch part 48a as a notch part, which is relatively close to the electrode tab 32, and the second notch part 48b as a notch part, which is relatively far from the electrode tab 32, in the plurality of notch parts 48. However, an embodiment of the present invention is not limited to the number of notch parts. That is, three or more notch parts 48 may be provided. Also, the plurality of notch pars 48 may be formed in parallel to a width (w1) direction of the outer protrusion 42.

As illustrated in FIGS. 1 to 3, the inner connection part 44 of the electrode lead 40 may also be divided into an area, which is electrically connected to the electrode tab 32, and an area, which is not electrically connected to the electrode tab 32. That is, as illustrated in FIGS. 1 and 3, the electrode lead 40 may include a tab bonding area 44a formed on one side of the notch part 48 and bonded to the electrode tab 32 and a tab non-bonding area 44b formed on the other side of the notch part 48 and connected to the insulation part 46 with respect to the notch part 48. FIG. 1 illustrates the tab bonding area 44a formed on one side of the first notch part 48a and bonded to the electrode tab 32 and the tab non-bonding area 44b formed on the other side of the first notch part 48a and connected to the insulation part 46. However, this does not mean that the entire tab bonding area 44a is bonded to the electrode tab 32. That is, a portion of the tab bonding area 44a may be bonded to the electrode tab 32. That is, a reference for distinguishing the tab bonding area 44a and the tab non-bonding area 44b may be determined by whether the inner connection part is formed on one side or on the other side opposite to the one side with respect to the notch part (the first notch part 48a in FIGS. 1 to 3) that is relatively the closest to the electrode tab 32 in the plurality of notch parts 48a and 48b.

The electrode lead 40 of the secondary battery 10 according to an embodiment of the present invention may have a bent structure. That is, the electrode lead 40 may be bent with respect to the notch part 48. FIGS. 2 and 3 illustrate a structure in which the inner connection part is bent by using the first notch part 48a as an axis so that the tab bonding area 44a and the tab non-bonding area 44b of the inner connection part 44 face each other, and the inner connection part 44 is bent by using the second notch part 48b as an axis so that the outer protrusion 42 and the insulation part 46 face the tab non-bonding area 44b.

According to an embodiment of the present invention, when the notch part is formed in a direction crossing a direction that is directed from the electrode assembly toward the outer protrusion, and also, the electrode lead is bent with respect to the plurality of notch parts, if the internal pressure of the secondary battery increases, the electrode may be more quickly cut, and also, utilization of the internal space of the secondary battery may increase.

The electrode lead 40 may have a straight-line (I) shape when the inner connection part 44 is unfolded by using the plurality of notch parts 48a and 48b axes. That is, as illustrated in FIG. 1, the outer protrusion 42, the insulation part 46, and the inner connection part 44 may be sequentially arranged in one direction in the electrode lead 40.

When the plurality of notch parts 48a and 48b are provided, the inner connection part 44 may be bent in a zigzag shape. That is, as illustrated in FIGS. 2 and 3, the inner connection part 44 may be bent in directions opposite to each other by using the first notch part 48a and the second notch part 48b as axes.

When the notch part is provided in plurality, the notch parts may have different thicknesses. For example, the notch part (the first notch part 48a in the drawings) that is relatively close to the electrode tab 32 may have a thickness less than that of the notch part (the second notch part 48b in the drawings) that is relatively far from the electrode tab 32.

Basically, when a short-circuit phenomenon or the like occurs in the secondary battery, the electrode assembly accommodated in the secondary battery increases in temperature, and thus, a gas is generated in the secondary battery, thereby increasing in internal pressure of the secondary battery. Thus, in order to quickly cut the electrode lead, it may be necessary to rupture the notch part, which is the closest to the electrode tab, of the plurality of notch parts. This is done because the area on which the internal pressure of the secondary battery most suddenly and most abruptly changes is the area around the electrode assembly.

Thus, in case in which the notch part that is relatively close to the electrode tab may have a thickness less than that of the notch part that is relatively far from the electrode tab, when the internal pressure of the secondary battery increases, the notch part that is relatively close to the electrode tab may be quickly ruptured. Since the notch part that is relatively far from the electrode tab is also ruptured after the notch part that is relatively close to the electrode tab is ruptured, abnormal current flowing through the electrode lead may be reliably interrupted.

However, unlike this, the notch part (the second notch part 48b in the drawings) that is relatively far from the electrode tab 32 may have a thickness less than that of the notch part (the first notch part 48a in the drawings) that is relatively close to the electrode tab 32.

In this case, when the internal pressure increases, the rupture of the notch part that is relatively far from the electrode tab and the rupture of the notch part that is relatively close to the electrode tab may occur at the same time or at a similar time, and also, a phenomenon in which the notch part (particularly, the notch part that is relatively close to the electrode tab) is easily ruptured even when the internal pressure of the secondary battery is within a normal range may be prevented from occurring.

FIG. 4 illustrates a state in which the notch part is cut by force of a generated gas when the gas is generated in the secondary battery due to a short-circuit phenomenon or the like in the secondary battery. Particularly, referring to FIG. 4, the first notch part 48a may be cut to separate the tab bonding area 44a and the tab non-bonding area 44b of the inner connection part from each other, and the second notch part 48b may be cut to separate the tab non-bonding area 44b of the inner connection part and the insulation part from each other. Thus, the electrode tab 32 may be completely electrically separated from the outer protrusion 42 connected to the external device. As a result, abnormal current flowing through the electrode lead 40 may be interrupted to improve safety of the battery.

Also, when the electrode lead is bent with respect to the notch part like an embodiment of the present invention, an area occupied by the electrode lead may be minimized in the internal space of the secondary battery to improve utilization of the internal space of the secondary battery.

In this specification, the term 'bent' may be replaced with a term 'folded'. Here, 'bent' may mean that the electrode lead is folded with respect to the notch part. Also, 'folded' may mean that the electrode lead is folded at an angle of about 180 degrees with respect to the notch part so that the tab bonding area and the tab non-bonding area face each other. That is, 'bent' may be a concept that includes 'folded'.

Referring to FIG. 1, the notch part 48 may be formed with a length corresponding to a width w2 of the inner connection part 44. When the notch part 48 is formed with a length corresponding to a width of the inner connection part 44, if the internal pressure of the secondary battery 10 increases, cutting of the electrode lead 40 may be completely performed.

FIGS. 5A to 5C are side cross-sectional views illustrating a shape of a notch part formed on one surface or both surfaces of an inner connection part of the secondary battery according to an embodiment of the present invention.

As illustrated in FIGS. 5A and 5B, each notch part 48 may have a shape that is recessed into only one surface of both surfaces of the inner connection part. In more detail, as illustrated in FIG. 5A, the notch part 48 may have a shape that is recessed into only a bottom surface of both surfaces of the inner connection part. Alternatively, as illustrated in FIG. 5B, the notch part 48 may have a shape that is recessed into a top surface of both surfaces of the inner connection part. Alternatively, as illustrated in FIG. 5C, the notch part 48 may have a shape that is recessed into both surfaces of the inner connection part.

Figure 6A:
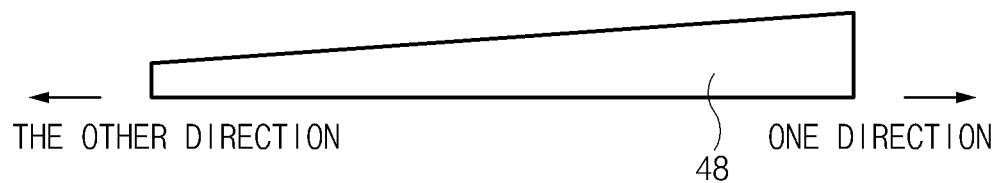
FIGS. 6A and 6B are side cross-sectional views illustrating the notch part having a thickness that varies in a longitudinal direction of the notch part according to an embodiment of the present invention.
Figure 6B:
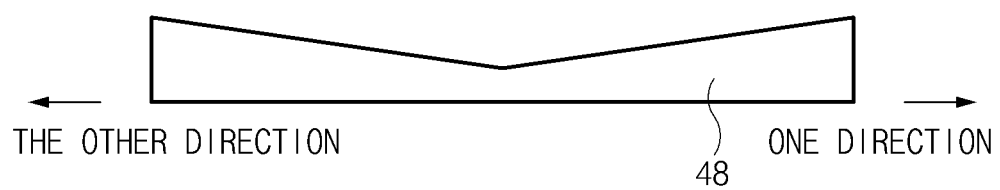

FIGS. 6A and 6B are side cross-sectional views illustrating the notch part having a thickness that varies in a longitudinal direction of the notch part according to an embodiment of the present invention.

As illustrated in FIGS. 6A and 6B, the notch part 48 may have a thickness varying in a longitudinal direction of the notch part 48.

For example, as illustrated in FIG. 6A, the notch part 48 may have a thickness that gradually increases in one direction and gradually decreases in the other direction.

As illustrated in FIG. 6B, the notch part 48 may have a thickness that gradually increases in both directions in which the notch part 48 is formed. On the other hand, the notch part 48 may have a thickness that gradually decreases in both directions, in which the notch part 48 is formed, with respect to one point.

As described above, according to an embodiment of the present invention, since the notch part is formed on the electrode lead, when the internal pressure of the secondary battery increases, the cutting of the electrode lead may be efficiently performed to improve the safety of the secondary battery. However, since the electrode lead has a relatively thin thickness at the notch part, electrical resistance may relatively increase. This may mean that power consumption is relatively large in the electrode lead, particularly the notch part, and also, a temperature in the notch part is relatively high.

Thus, according to another embodiment of the present invention, a conductive material having electrical conductivity may be applied to at least a portion of a surface of the notch part. For example, the conductive material may be applied to the surface of the notch part so that the electrode lead has a uniform thickness on the whole. Since the conductive material is applied to at least a portion of the surface of the notch part, the problem in which the electrical resistance increases in the notch part may be solved. However, even in this case, since it is still necessary to effectively rupture the notch part when the internal pressure of the secondary battery increases, the conductive material may have relatively weak strength when compared to that of the material forming the electrode lead. The rupture strength of the conductive material according to another embodiment of the present invention may be relatively less than that of the electrode lead.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
an electrode assembly comprising an electrode tab;
an outer case accommodating the electrode assembly; and
an electrode lead electrically connected to the electrode tab,
wherein the electrode lead comprises:
an outer protrusion protruding to the outside of the outer case in a first direction;
an inner connection part disposed in the outer case, an insulation film provided on an area of the inner connection part facing the outer case; and
first and second notch parts disposed on the inner connection part and having a relatively thin thickness when compared to that of a remaining area of the electrode lead, the first and second notch parts being spaced apart from each other, the first notch part being disposed between the insulation film and the outer protrusion, the first notch part having a thickness different than that of the second notch part,
wherein each of the first and second notch parts includes an indentation extending into a thickness of the inner connection part, each indentation being a groove extending in a second direction that is transverse to the first direction that is directed from the electrode assembly toward the outer protrusion,
the inner connection part comprises:
a tab bonding area disposed on one side of the first notch part and bonded to the electrode tab; and
a tab non-bonding area disposed on another side of the first notch part and integrally connected to the outer protrusion,
wherein the inner connection part is bent by using the first and second notch parts as respective axes so that the tab bonding area and the tab non-bonding area face each other.

2. The secondary battery of claim 1, wherein the bent directions of the inner connection part by using the first notch part and the second notch part as the axes are opposite to each other.

3. The secondary battery of claim 1, wherein the electrode lead has a straight-line (I) shape when the inner connection part is unfolded by using the first and second notch parts as the respective axes.

4. The secondary battery of claim 1, wherein each of the first and second notch parts has a shape that is recessed into only one surface of the inner connection part.

5. The secondary battery of claim 1, wherein each of the first and second notch parts has a shape that is recessed into more than one surface of the inner connection part.

6. The secondary battery of claim 1, wherein each of the first and second notch parts has a thickness that varies according to a position thereof.

7. The secondary battery of claim 1, wherein the first notch part is disposed relatively close to the electrode assembly when compared to the second notch part, and the first notch part has a thickness less than that of the second notch part.

8. The secondary battery of claim 1, wherein the first notch part is disposed relatively close to the electrode assembly when compared to the second notch part, and the second notch part has a thickness less than that of the first notch part.

9. The secondary battery of claim 1, wherein each of the first and second notch parts has a thickness that gradually decreases in both directions, in which the notch part is disposed, with respect to a predetermined point.

10. The secondary battery of claim 1, wherein each of the first and second notch parts has a thickness that gradually increases in both directions, in which the notch part is disposed, with respect to a predetermined point.

11. The secondary battery of claim 1, further comprising a conductive material having electrical conductivity, which is applied to at least a portion of a surface of each of the first and second notch parts.

12. The secondary battery of claim 11, wherein the conductive material has rupture strength less than that of the electrode lead.

* * * * *